United States Patent [19]

Kubota et al.

[11] Patent Number: 4,888,576

[45] Date of Patent: Dec. 19, 1989

[54] METHOD AND SYSTEM FOR DETECTING THE LEVEL OF ENGINE OIL OF AN ENGINE

[75] Inventors: Shin'ichi Kubota; Hideyo Miyano; Hiromitsu Adachi, all of Wako, Japan

[73] Assignee: Honda Giken Kogyo Kabushiki Kaisha, Tokyo, Japan

[21] Appl. No.: 337,137

[22] Filed: Apr. 12, 1989

Related U.S. Application Data

[60] Division of Ser. No. 244,579, Sep. 13, 1988, which is a continuation of Ser. No. 921,129, Oct. 21, 1986, abandoned.

[30] Foreign Application Priority Data

Oct. 21, 1985 [JP] Japan ................................. 60-234733

[51] Int. Cl.⁴ .............................................. B60Q 1/00
[52] U.S. Cl. ..................................... 340/451; 340/626
[58] Field of Search ............... 340/451, 459, 450.3, 340/626

[56] References Cited

U.S. PATENT DOCUMENTS

| | | |
|---|---|---|
| 3,196,389 | 7/1965 | Heidner . |
| 3,906,440 | 9/1975 | Haupt ............................. 340/451 X |
| 4,328,480 | 5/1982 | Keitel et al. ........................ 340/451 |
| 4,417,231 | 11/1983 | Watt ................................ 340/451 X |
| 4,489,311 | 12/1984 | Lang et al. ...................... 340/451 X |
| 4,503,419 | 3/1985 | Kidd et al. . |
| 4,584,554 | 4/1986 | Weiss . |

FOREIGN PATENT DOCUMENTS

| | | |
|---|---|---|
| 2404827 | 8/1974 | Fed. Rep. of Germany . |
| 3304805 | 9/1983 | Fed. Rep. of Germany . |
| 2065349 | 6/1981 | United Kingdom . |
| 2183305 | 6/1987 | United Kingdom ................ 340/451 |

Primary Examiner—Joseph A. Orsino
Assistant Examiner—Brian R. Tumm
Attorney, Agent, or Firm—Birch, Stewart, Kolasch & Birch

[57] ABSTRACT

Method and system for detecting a level of an engine oil of an engine include an operation for detecting a time duration in which the engine is operating. When the engine operation has continued for more than a predetermined time period, and the engine is stopped subsequently, the oil level is detected after the elapse of a second predetermined time period in which the engine is stopped. By this feature, the engine oil level is detected very accurately.

1 Claim, 6 Drawing Sheets

METHOD AND SYSTEM FOR DETECTING THE LEVEL OF ENGINE OIL OF AN ENGINE

This application is a divisional of copending application Ser. No. 07/244,579, now allowed, filed on Sept. 13, 1988, which is a continuation of Ser. No. 06/921,129 filed on Oct. 21, 1986 and now abandoned.

BACKGROUND OF THE INVENTION

1. Field of the Invention

The present invention relates to method and system for detecting the level of the engine oil of an engine, such as an automobile engine.

2. Description of Background Information

Automotive engines have many moving parts which make frictional contacts with each other. Excessive friction between such parts as pistons, rings and cylinders may result in waste of engine power, abrasive metal wear, or seize up of parts by heat generated by friction. Engine oil (lubricating oil in an automobile engine) is supplied to every friction-generating part so that it functions to reduce the friction between lubricated surfaces of the parts and to assure smooth operation of the engine. Further, engine oil performs such tasks as to carry away heat from friction-generating parts, and to prevent rust and corrosion, and moreover, to act as a seal to prevent leakage of gases from the combustion chamber of the engine.

In an automobile engine, the engine oil is retained in the oil pan provided in the crankcase, and supplied to each friction-generating part of the engine.

Generally the amount of oil in the oil pan is gradually reduced with the engine operation because of various reasons such as burning (oxidation), leakage, or vaporization. Shortage of volume of oil because of the reasons stated above will cause serious damages to the functions of engine oil stated before, and may result in a stoppage of the engine operation.

Thus, it is very important to detect whether the volume of the engine oil is sufficient or not, for operating the engine in good condition.

OBJECT AND SUMMARY OF THE INVENTION

An object of the present invention is to provide a method and system for detecting an oil level of an engine which enables a very accurate detection operation.

According to the present invention, a method for detecting an oil level of an engine is characterized by executing a detection of the oil level when an engine operation has stopped for more than a second predetermined time period after an engine operation which has continued for more than a first predetermined time period.

According to another aspect of the invention, a system for detecting insufficiency of an engine oil of an engine having an ignition switch, an oil pan, and an engine oil supply passage, comprises a level detector for detecting whether or not a level of the engine oil in said oil pan is lower than a first predetermined level, a pressure detector for detecting whether or not a pressure of the engine oil in said pressure supply passage is lower than a second predetermined level, and an alarm controller connected to the level detector and the pressure detector, for generating an alarm when it is detected by the level detector, immediately after a turning on of the ignition switch, that the level of the engine oil is lower than the first predetermined level, and generating the alarm when it is detected by the pressure detector, after a starting of the engine, that the pressure of the engine oil is lower than the second predetermined level.

BRIEF DESCRIPTION OF THE DRAWINGS

FIGS. 3 and 4 are diagrams showing the juxtaposition of FIGS. 3A and 3B, FIGS. 4A and 4B respectively.

DETAILED DESCRIPTION OF THE INVENTION

Referring to FIGS. 1 through 7 of the accompanying drawings, the embodiment of the method for detecting an oil level of an engine according to the present invention will be explained hereinafter.

Figure 1:
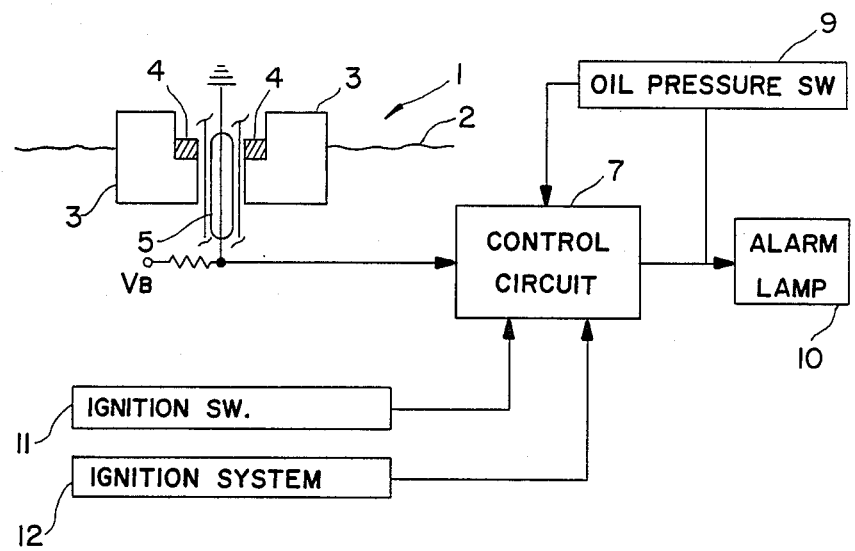
FIG. 1 is a schematic diagram showing a general construction of a detection system in which a method for detecting the oil level according to the present invention is adopted.

In FIG. 1 which illustrates the internal combustion engine for an automobile in which the method according to the present invention is utilized.

As shown, an oil level sensor 1 is provided in an oil pan (not illustrated).

The oil level sensor 1 comprises an annular float 3 arranged to stay on the surface 2 of the engine oil in the oil pan, a magnet 4 provided in the central portion of the float 3, and a reed switch 5 fixed in the oil pan, at a position corresponding to a lower reference level of the engine oil in the oil pan in such a manner that it is inserted into a central hole of the annular float. A terminal of the reed switch 5 is grounded and the other terminal of it is connected to a control circuit 7 which will be explained in detail later. With this construction, if the amount of the engine oil is reduced, the position of the float 3 also reduces. When the oil level falls to the lower reference level, the lead switch 5 is switched off by the magnetic force of the magnet 4.

The control circuit 7 is connected with an ignition system 12 of the engine, an oil pressure switch 9 which turns on when the pressure in an engine oil supply pipe is lower than a predetermined level, and a warning lamp 10. A power voltage $V_B$ is supplied to the control circuit 7 through an ignition switch 11. The system is constructed such that the closure of the oil pressure switch 9 as a result of an insufficient oil pressure causes a lighting of the warning lamp 10. Further, the oil pressure switch 9 has another terminal for transmitting an output signal whose level varies with the turning on and off of the oil pressure switch 9, to the control circuit 7.

Figure 2:
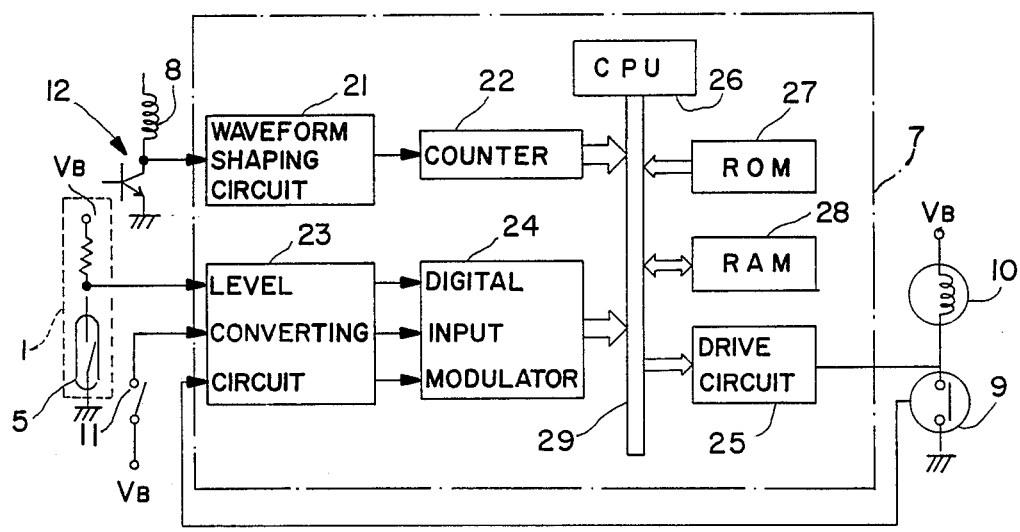
FIG. 2 is a block diagram showing a concrete construction of the control circuit 7 of the detection system shown in FIG. 1.

As illustrated in FIG. 2, the control circuit 7 includes a waveform shaping circuit 21 which performs the waveform shaping of an electric signal obtained from a primary winding 8 of an ignition coil of the ignition circuit 12. A counter 22 for measuring intervals of pulse signals output from the waveform shaping circuit 21, a level converting circuit 23 for performing level conversion of signals from the oil level sensor 1, the ignition switch 11, and the oil pressure switch 9, and a digital input modulator 24 for transforming output signal levels of the level converting circuit 23 into data indicating switch positions of each switch, are also provided in the control circuit 7. The control circuit 7 further includes a drive circuit 25 for controlling the flash of the warning lamp 10, a CPU 26 for executing digital operations according to predetermined programs, a ROM 27 in which various programs and data are stored, and a RAM 28. The counter 22, the digital input modulator 24, the drive circuit 25, the CPU 26, the ROM 27, and the RAM 28 are mutually connected by means for an input/output bus 29.

With this construction, data indicating the engine rotational sped are supplied from the counter 22 to the CPU 26 via the input/output bus 29. Similarly, information representing on/off positions of the lead switch 5 of the oil level sensor 1, the ignition switch 11, and the oil pressure switch 9 is supplied to the CPU 26 through the input/output bus 29. By using the information described above, the CPU 26 performs an engine oil level detection operation according to the present invention in accordance with a clock pulse signal generated at a clock pulse generator (not shown). The drive circuit 25 has a multivibrator (also not shown) having an oscillation frequency of 1 Hz. In response to a flash command signal generated by the CPU 26, the drive circuit 25 drives the warning lamp 10 to flash at a frequency of the oscillation of the multivibrator. Also, the drive circuit 25 stops the flashing of the warning lamp 10 in response to a flash drive stop command signal.

Turning to FIGS. 3A and 3B, 4A and 4B showing a flow of operation, the operation of the system including the CPU 26 will be explained hereinafter.

In The CPU 26, at first, when a battery is connected for engine operation, or when the ignition switch is turned on (from an off state), an initialization is performed by setting a value "0" for a flag PIINT indicating a completion of the oil pressure detection upon starting the engine, and for a flag Alarm indicating an abnormal oil pressure, at a step 51. Then a flash drive stop command signal is supplied to the drive circuit 25 so that the warning lamp 10 turns off, at a step 52. Subsequently, whether or not the ignition switch 11 is turned on is detected at a step 53. If the ignition switch 11 is detected to be turned off at the step 53 with the battery connected, a value "1" is set for a flag $F_M$ so that it is memorized that the mode of operation is an alarm mode, at a step 54. If, on the other hand, the ignition switch 11 is detected to be turned on at the step 53, whether or not the flag $F_M$ is "1" or not is detected at a step 55.

If $F_M=1$, the value "1" is set for a flag $F_A$ which indicates a time duration of the operation of the engine and a flag $F_B$ which indicates time duration of the stoppage of the engine, at a step 56. Then whether or not 80 millisec. have elapsed after the turning of the ignition switch 11 is detected at a step 57. If 80 millisec. have elapsed, a variable $n_1$ is made equal to "0" at a step 58. The on/off state of the reed switch 5 of the oil level sensor is then read in, and whether or not the reed switch 5 is turned on is detected at a step 59. When the reed switch 5 is "on", a value of summation between the variable $n_1$ and a value "1" is set as a new value of the variable $n_1$ at a step 60. Then whether or not the value variable $n_1$ is equal to 10 is detected at a step 61. If $n_1=10$, whether or not 10 millisec. have elapsed after the previous read in of the on/off state of the reed switch 5 is detected at a step 62. If 10 millisec. have elapsed, the operation of the step 59 is executed again to read-in the on/off state of the reed switch 5.

When the reed switch 5 of the oil level sensor 1 is turned off, it means that the oil level is lower than the lower reference level and the amount of the oil is not sufficient, and the value "1" is set for the flag $F_M$ so that it is memorized that the mode of operation is the alarm mode, at a step 64. Then the flash drive command is supplied to the drive circuit 25 at a step 65. In response to the flash drive command signal, the drive circuit 25 makes the alarm lamp flashing at the frequency of 1 Hz. After the generation of the flash drive command signal, whether or not the ignition switch 11 is turned on is detected at a step 66. If it is detected that the ignition switch is turned off, the flash drive stop command signal is supplied to the drive circuit 25 at a step 67. If, on the other hand, the flashing of the alarm lamp 10 is continued until the ignition switch 11 turns off.

If $F_M=0$ at the step 55, it means that the mode of operation is not the alarm mode. Therefore, whether or not the flag $F_A$ is equal to "0", and whether or not the flag $F_B$ is equal to "0", are detected at steps 68 and 69 respectively. In the following steps, the value "1" is set for the flag $F_A$ if the time duration of the operation of the engine is longer than a first predetermined time period $T_1$ (10 min., for example). On the other hand, the value "1" is set for the flag $F_B$ if the time duration of the stoppage of the engine is longer than a second predetermined time period $T_2$ (15 min., for example). If $F_A=1$, and $F_B=1$, after the elapse of each time duration, whether or not 80 m sec. have elapsed after the turning of the ignition switch 11 is detected at a step 70. When 80 m sec. have elapsed, the variable $n_2$ is made equal to "0" at a step 71, and the switch position of the reed switch 5 of the oil level sensor 1 is read in, to determine whether or not the reed switch 5 is turned off at a step 72. If the reed switch 5 is turned off, a value "1" is added to the variable n , and a result of the summation is set as a new value of the variable $n_2$ at a step 73. Subsequently, whether or not the variable $n_2$ is equal to 10 is detected at a step 74. If $n_2=10$, whether or not 10 m sec. have elapsed after a previous reading of the switch position of the reed switch 5, is detected at a step 75. When a result of detection at the step 75 is that 10 millisec have already elapsed, the operation of the step 72 is executed again, to read in the switch position of the reed switch 5. If, on the other hand, $n_2=10$, it means that the amount of the engine oil is insufficient, and the operation of the step 64 is executed.

When the reed switch 5 of the oil level sensor 1 is turned on, it means that the oil level is higher than the lower limit level, and the amount of the engine oil is in a suitable range. Therefore, the value "0" is set for the flag $F_M$ so as to memorize that the mode of operation of the system is the non-alarm mode, at a step 77. On the other hand, the flag $F_M$ is made equal to "0" by the execution of the operation of the step 77 when, at the step 61, it is detected that the value of $n_1$ is equal to "10" more than ten times by the detection of the closed state of the reed switch 5. Similarly, the flag $F_M$ is made equal to "0" when, at the step 68, the flag $F_A$ is detected to be equal to "0" because the time duration of the operation of the engine is shorter than the first predetermined time $T_1$, or when, at the step 69, the flag $F_B$ is detected to be equal to "0" because the time duration of the stoppage of the engine is shorter than the second predetermined time $T_2$. Subsequently, whether or not the ignition switch 11 is turned on, is detected at a step 78. If it is detected that the ignition switch 11 is turned on, count down of a time counter B (not shown) in the CPU 26 is started, and whether or not the count value $T_B$ after the down counting is equal to zero is detected at a step 79. The count value $T_B$ of the time counter B is initialized to the second predetermined time period $T_2$ every time the ignition switch 11 is turned on. If $T_B \neq 0$, whether or not the engine speed Ne is smaller than 40 r.p.m. is detected at a step 80. If $T_B = 0$, a value "1" is set for the flag $F_B$ at a step 81, to memorize that the time duration of the stoppage of the engine becomes more than the second predetermined time period. Then the operation of the step 80 is executed. If Ne<40 r.p.m., it is regarded that the engine has stalled, and the operation of the step 78 is executed again, and measuring of the time duration of the stoppage of the engine because of the engine stall will be executed. If Ne≧40 r.p.m., the value "0" is set to the flags $F_A$ and $F_B$, and to a pressure detection flag $F_P$ at a step 82. Also at the step 82, the first predetermined time $T_1$ is set as a count value $T_A$ of a time counter A (not shown) in the CPU 26, and the second predetermined time $T_2$ is set as the count value TB of the time counter B.

Then, whether or not the pressure detection flag $F_P$ is equal to "0" is detected at a step 83. If $F_P = 0$, it is regarded that the detection of the oil pressure by means of the oil pressure switch 9 is not possible, and whether or not the flag PIINT is equal to "1" is detected at a step 84. If PIINT=0, it means that the check of the oil pressure upon starting of the engine is not completed, and whether or not the oil pressure switch 9 is turned on is detected at a step 85. If the oil pressure is in a normal range and the oil pressure switch is turned off, the flash drive command signal is supplied to the drive circuit 25 at a step 86. Subsequently, whether or not a time period $T_3$ within which the lamp 10 flashes three times, has elapsed after the generation of the flash drive command signal by means of a count value of a time counter C (not shown) provided in the CPU 26, at a step 87. If the time period $T_3$ has elapsed, the flash drive stop command signal is supplied to the drive circuit 25 at a step 88, and the value "1" is set for the flag PIINT, at a step 89, to memorize that the oil pressure check upon starting of the engine has been completed. Then, by the flashing of the alarm lamp 10 three times, it is indicated that the oil pressure at the time of the start of the engine is in the normal range.

Subsequently, whether or not a condition which the engine speed Ne is faster than 750 r.p.m. has been continued for more than 5 seconds is detected at a step 90. The operation of the step is executed immediately when it is detected that PIINT is equal to "1" at the step 84 because the oil level check at the time of the start of the engine has been completed, or when it is detected, at the step 85, that the oil pressure switch 9 is turned on because of the amount of the oil is not sufficient. If a condition in which the engine speed Ne is faster than 750 r.p.m. has continued for more than 5 seconds, the value "1" is set for the pressure detection flag $F_P$ at a step 91 so as to memorize that the detection of oil pressure is possible If, on the other hand, the condition in which Ne>750 r.p.m. has not continued for more than 5 seconds, whether or not the engine rotational speed $N_e$ is slower than 750 r.p.m. is detected at a step 92. If Ne≦750 r.p.m., the value "0" is set for the pressure detection flag $F_P$, at a step 93, for memorizing that the detection of the oil pressure is not possible. Then, whether or not the flag Alarm is equal to "1" is detected at a step 94. If the flag Alarm=1, the flash drive signal is supplied to the drive circuit 25 at a step 95 because the oil pressure is out of the normal range. If the flag Alarm=0, down counting of the time counter A by a predetermined value is started, and whether or not the count value $T_A$ after the down counting is equal to "0" is detected at a step 96. In other words, whether or not the first predetermined time $T_1$ has elapsed after the starting of the engine operation is detected. If $T_A = 0$, it is regarded that the predetermined time $T_1$ has elapsed after the start of the engine operation, and the value "1" is set for the flag $F_A$ at a step 97. Then whether or not the engine speed Ne is slower than 40 r.p.m. is detected at a step 98. If $T_A \neq 0$, the operation of the step 98 is executed immediately. If Ne<40 r.p.m., it means that the engine is not operating, and whether or not the ignition switch 11 is turned on, is detected at a step 78. If, on the other hand, Ne≧40 r.p.m., it means that the engine is operating, and the operations of the steps from the step 82 are executed again.

At the step 83, if it is detected that $F_P = 1$, it indicates that the detection of the oil pressure by means of the oil pressure switch 9 is possible, and whether or not a condition in which the oil pressure switch 9 is turned on has continued for more than 500 millisec., is detected at a step 99. If the oil pressure switch 9 is turned on for more than 500 millisec., it indicates that the pressure of the engine oil is not sufficient, and the value "1" is set for the flag Alarm, at a step 100, to memorize the state in which the oil pressure is insufficient. Subsequently, the operation of the step 92 will be executed. If the oil pressure switch has not been closed for more than 500 millisec., the operation of the step 92 will be executed immediately. In addition, the operation of the step 99 is to detect a temporary closing of the oil pressure switch, i.e., the oil pressure is around the predetermined level, and to cause the flashing of the warning lamp 10. However, if the oil pressure reduces further, the switch 9 will operate to turn on the warning lamp 10 continuously.

On the other hand, if it is detected that the ignition switch 11 is turned off at the step 78, whether or not the flag $F_A$ is equal to "1" is detected at a step 101. If $F_A = 1$, it means that, at the step 96, it has been detected that, the time duration of the engine operation before the ignition switch 11 is turned off, is longer than the first predetermined time $T_1$. Therefore, the temperature of the engine oil has risen sufficiently and the viscosity of the engine oil is low. This means that the engine oil can return to the oil pan from various portions of the engine within the second predetermined time period $T_2$ after the stoppage of the engine. Therefore, if $F_A = 1$, down counting of the time counter B by a predetermined value is started, and whether or not the count value $T_B$ after down counting is equal to "0" is detected at a step 102. If $T_B = 0$, the value "1" is set for the flag $F_B$, at a step 103, to memorize that the duration of the stoppage of the engine exceeds the second predetermined time period. At the time of the next execution of this routine, the operations of the steps 68 through 75 are performed, and the condition of the engine oil is determined by means of the switch position of the reed switch 5 of the oil level sensor 1.

Figure 5:
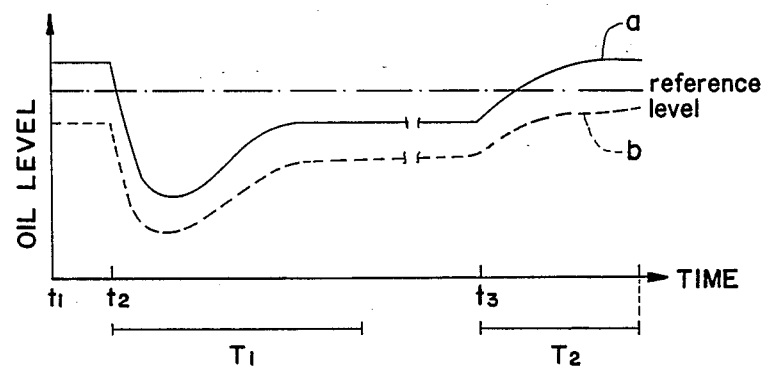
FIG. 5 is a diagram showing a relationship between the engine operation and the change in the oil level.
Figure 3A:
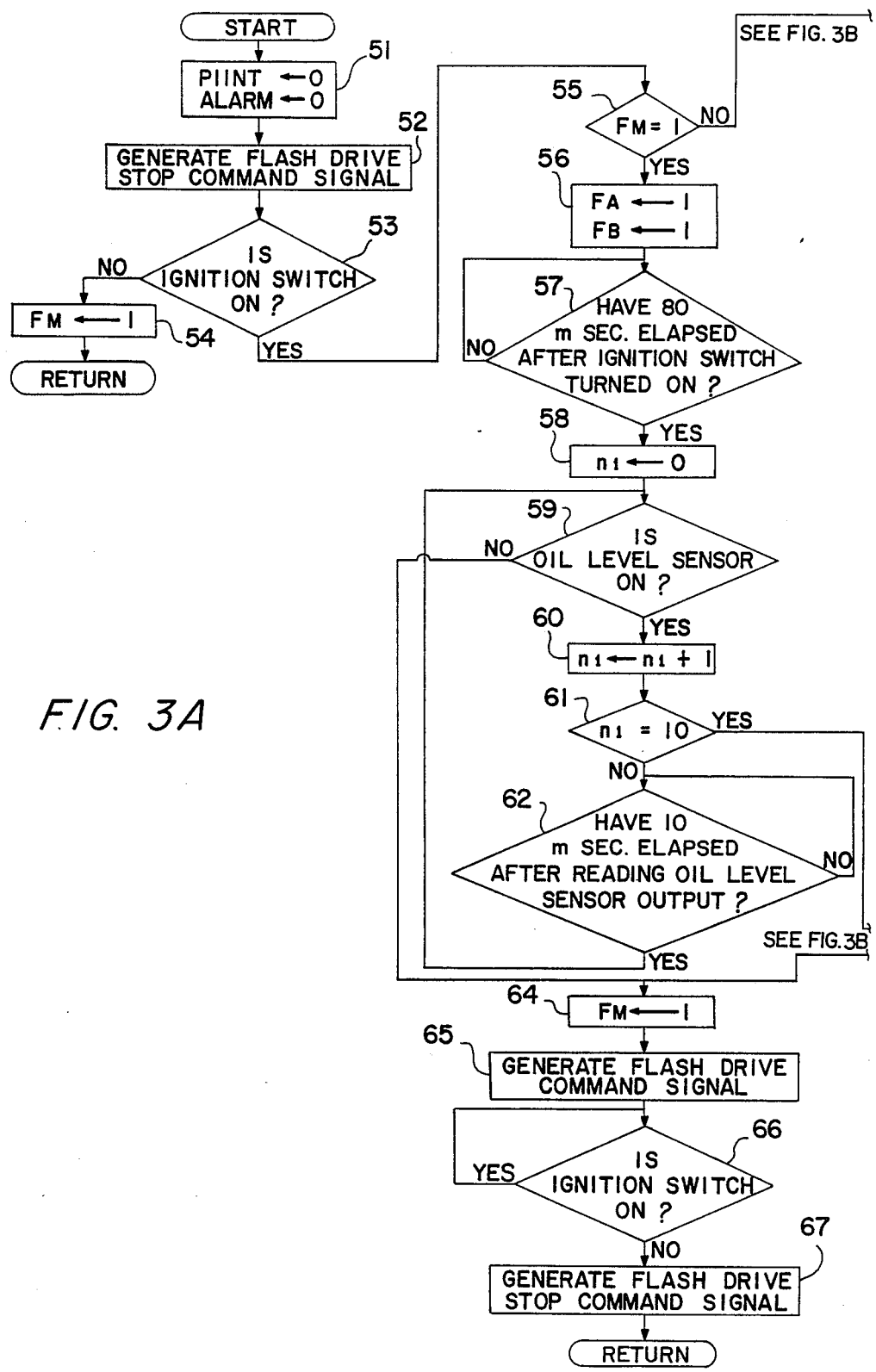
FIGS. 3A and 3B, 4A and 4B, when combined, are a flowchart showing the manner of operation of the CPU 26 of the control circuit 7 shown in FIG. 2.
Figure 3B:
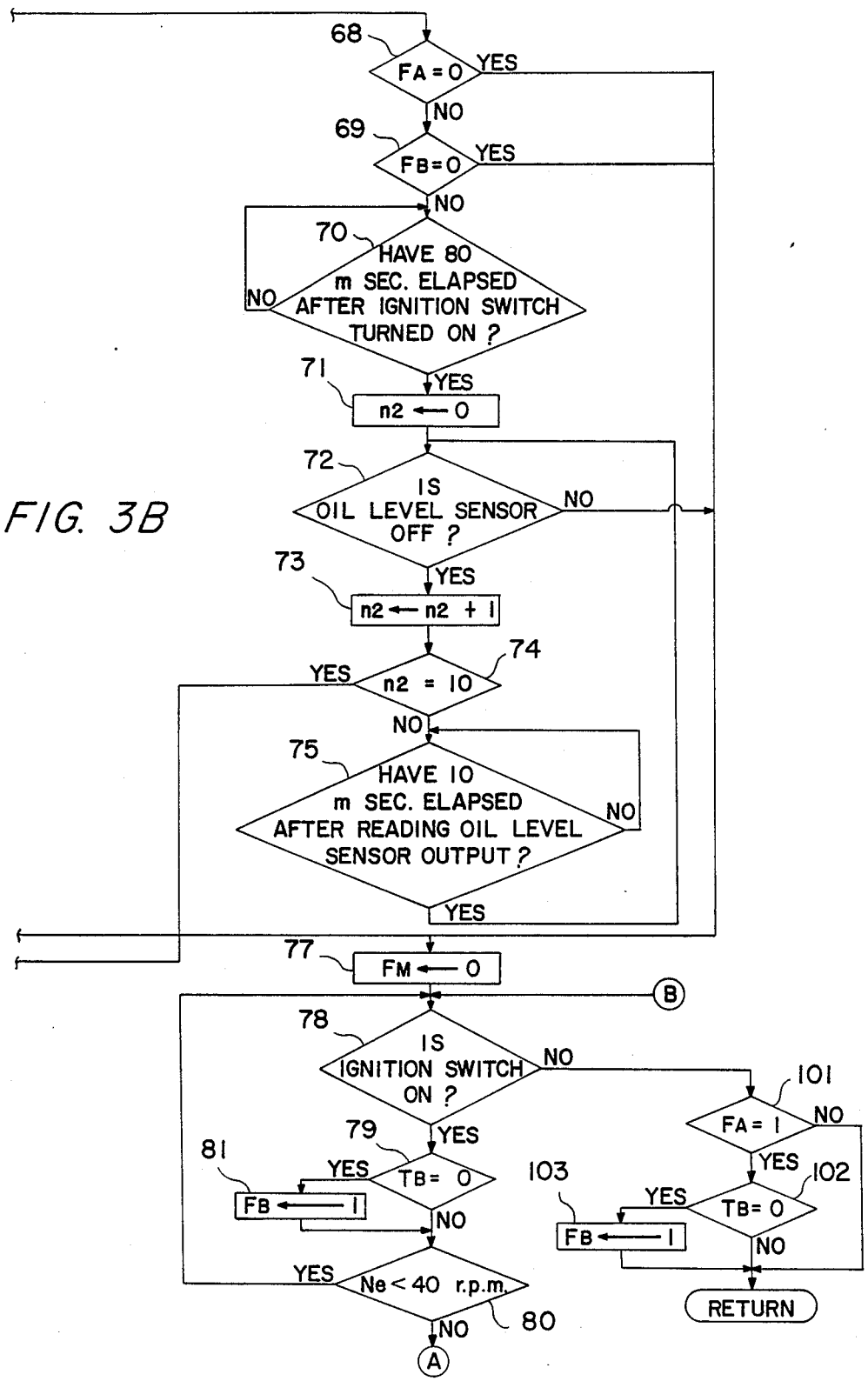
Figure 4A:
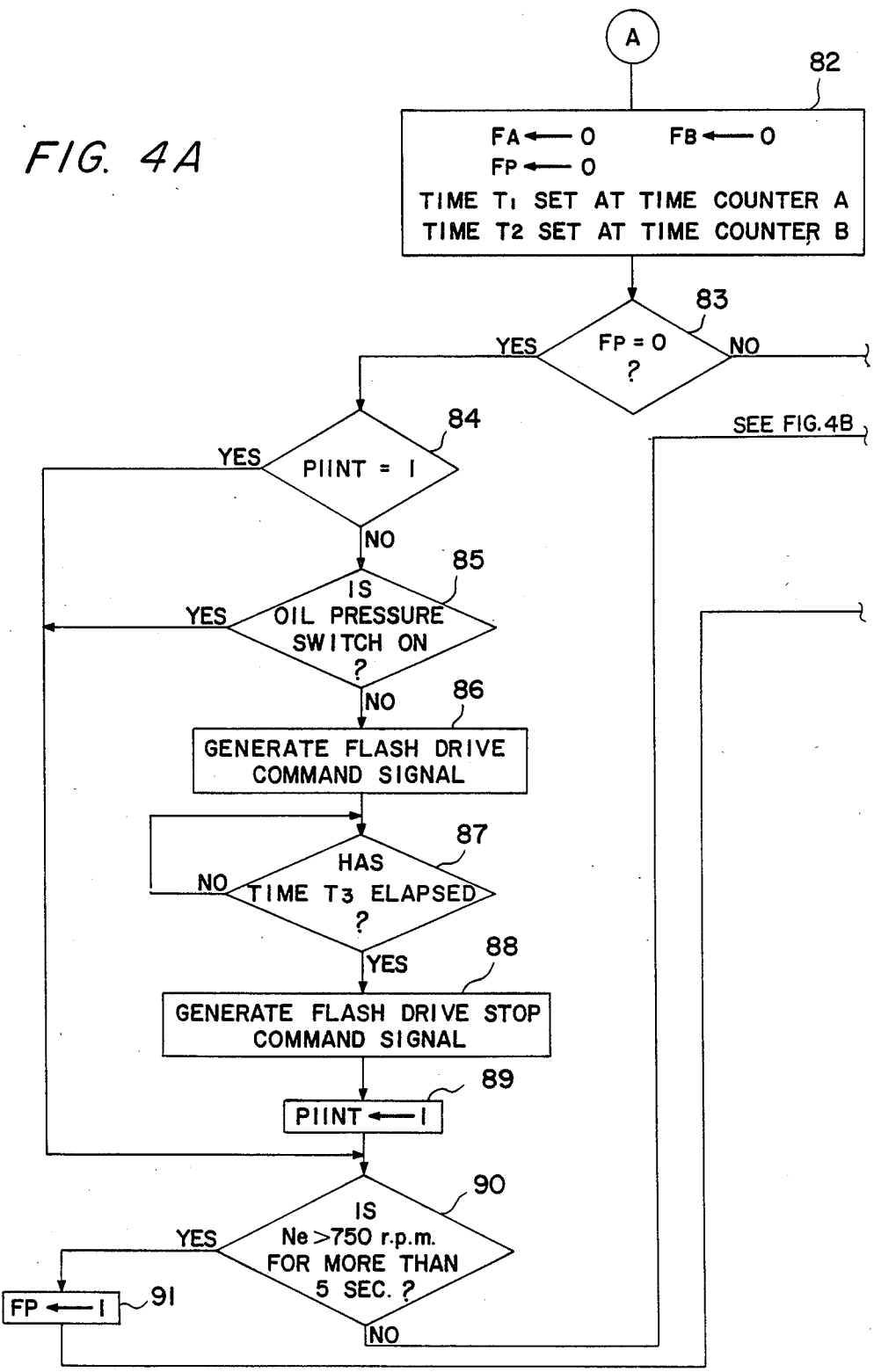
Figure 4B:
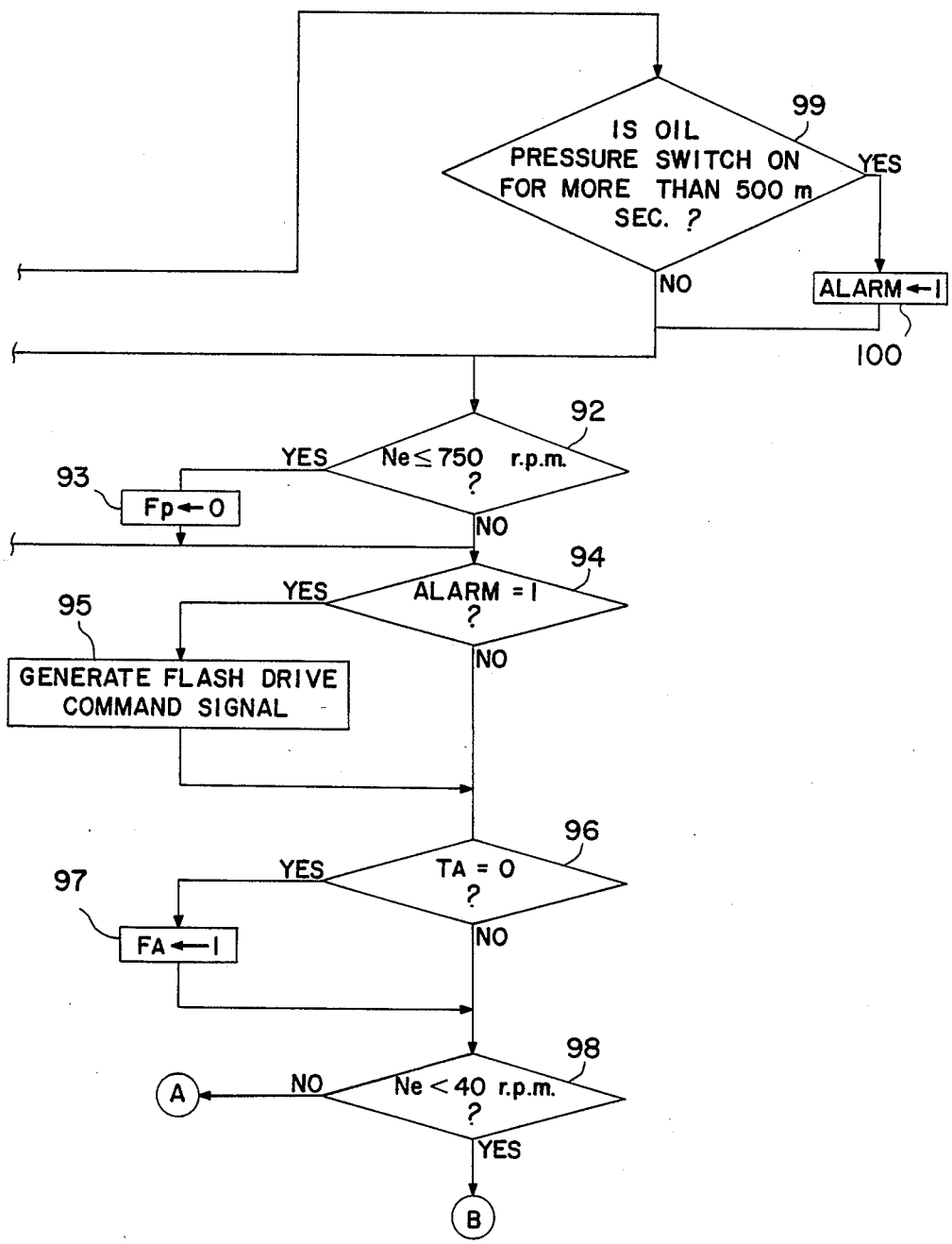

FIG. 5 shows the operation the detection method according to the present invention graphically. As shown, if the ignition switch 11 is turned on and cranking of the engine is started, at a time $t_1$, the oil level is detected because most part of the engine oil remains in the oil pan. If the engine starts at a time $t_2$, engine oil is supplied to various frictional parts of the engine, and the level of the engine oil in the oil pan goes down. This reduction of the engine oil is stabilized with time. Therefore, the first predetermined time $T_1$ is selected to be a time period in which the oil level reaches a stable level. When the engine operation is stopped at a time $t_3$, the engine oil returns to the oil pan gradually. Therefore, the level of the engine oil rises gradually. As the elapse of second predetermined time period from the point of time $t_3$, the engine oil level approaches to a level where the level detection can be performed accurately. Therefore, the oil level is detected by the oil level sensor 1 after the elapse of the second predetermined time period from the time point $t_3$. If, as indicated by the solid line a of FIG. 5, the oil level is higher than the reference level, it is determined that the amount of the engine oil is sufficient. On the other hand, if as indicated by the dashed line b of FIG. 5, the oil level is below the reference level, it is determined that the amount of the oil is insufficient.

It will be appreciated from the foregoing, that in the case of the method for detecting an oil level according to the present invention, the level of the engine oil is detected after the engine operation which has been continued for more than the first predetermined period has stopped for a second predetermined time period. In this way, the engine oil level is detected when almost all of the engine oil has returned to the oil pan. Thus, very accurate detection of the engine oil level is realized.

What is claimed is:

1. A system for detecting insufficiency of an engine oil of an engine having an engine oil supply passage, comprising:

pressure detection means for detecting whether or not an engine oil pressure in said engine oil supply passage is lower than a predetermined pressure level;

alarming means connected to said pressure detection means, for generating an alarm when it is detected by said pressure detection means, after a starting of the engine, that said engine oil pressure is lower than the predetermined pressure level; and control means connected to said pressure detection means and said alarming means, for operating said alarming means for a predetermined time period when it is detected by said pressure detection means, upon starting of the engine, that said engine oil pressure is equal to or higher than the predetermined pressure level, thereby to indicate that the pressure detection means is operating properly and the engine oil pressure is high enough.

* * * * *